United States Patent
Woinoski et al.

(10) Patent No.: US 12,530,805 B2
(45) Date of Patent: Jan. 20, 2026

(54) DATA RATE CONTROL FOR IMAGE TRANSMISSION

(71) Applicant: Teledyne FLIR Commercial Systems, Inc., Goleta, CA (US)

(72) Inventors: Timothy Woinoski, Coquitlam (CA); Shuen Yan Stephen Se, Richmond (CA)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 756 days.

(21) Appl. No.: 17/701,551

(22) Filed: Mar. 22, 2022

(65) Prior Publication Data

US 2022/0321777 A1    Oct. 6, 2022

Related U.S. Application Data

(60) Provisional application No. 63/168,172, filed on Mar. 30, 2021.

(51) Int. Cl.
  *G06T 9/00*   (2006.01)
  *G06T 3/40*   (2006.01)

(52) U.S. Cl.
  CPC . *G06T 9/00* (2013.01); *G06T 3/40* (2013.01)

(58) Field of Classification Search
  CPC .............. H04B 10/116; H04B 10/1143; H04B 10/516; H04B 10/11; H04B 10/541; H04B 10/1149; G06V 40/166; G06V 40/171; G06V 40/172; G06V 40/176; G06V 20/50; G06V 40/40; G06V 40/70; G06V 10/145; G06V 10/60; G06V 10/82; G06V 40/16; G06V 40/174; G06F 21/32; G06F 16/532; G06F 40/40; G06F 3/16; G06F 3/1423; G06F 16/51; G06F 9/5027
  See application file for complete search history.

(56) References Cited

U.S. PATENT DOCUMENTS

| | | | |
|---|---|---|---|
| 6,927,710 B2 | 8/2005 | Linzer et al. | |
| 9,686,560 B2 | 6/2017 | Sicard | |
| 2009/0086627 A1* | 4/2009 | Ujjain | H04L 1/0016 370/229 |
| 2011/0080947 A1* | 4/2011 | Chen | H04N 19/146 375/240.12 |
| 2018/0137119 A1* | 5/2018 | Li | H04N 23/63 |
| 2019/0200013 A1* | 6/2019 | Wu | H04N 19/164 |

* cited by examiner

*Primary Examiner* — Alex Kok S Liew
(74) *Attorney, Agent, or Firm* — Haynes and Boone, LLP

(57) ABSTRACT

Techniques for facilitating data rate control for image transmission are provided. In one example, a system includes an image sensor device configured to capture image data based on a frame transmission rate. The system further comprises a processing circuit configured to generate, based on the image data, an image for transmission by the processing circuit via a frame transmission process. The frame transmission process includes transmitting images according to the frame transmission rate. The processing circuit is further configured to determine a data rate based on the image and the frame transmission rate. The processing circuit is further configured to selectively adjust the frame transmission process based at least on the data rate and a data rate threshold. Related devices and methods are also provided.

20 Claims, 8 Drawing Sheets

DATA RATE CONTROL FOR IMAGE TRANSMISSION

CROSS REFERENCE TO RELATED APPLICATIONS

This application claims priority to and the benefit of U.S. Provisional Patent Application No. 63/168,172 filed Mar. 30, 2021 and entitled "DATA RATE CONTROL FOR IMAGE TRANSMISSION," which is hereby incorporated by reference in its entirety.

TECHNICAL FIELD

One or more embodiments relate generally to imaging and more particularly, for example, to data rate control for image transmission.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a system includes an image sensor device configured to capture image data based on a frame transmission rate. The system further comprises a processing circuit configured to generate, based on the image data, an image for transmission by the processing circuit via a frame transmission process. The frame transmission process includes transmitting images according to the frame transmission rate. The processing circuit is further configured to determine a data rate based on the image and the frame transmission rate. The processing circuit is further configured to selectively adjust the frame transmission process based at least on the data rate and a data rate threshold.

In one or more embodiments, a method includes capturing image data based on a frame transmission rate. The method further includes generating, based on the image data, an image for transmission via a frame transmission process. The frame transmission process includes transmitting images according to the frame transmission rate. The method further includes determining a data rate based on the image and the frame transmission rate. The method further includes selectively adjusting the frame transmission process based at least on the data rate and a data rate threshold.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
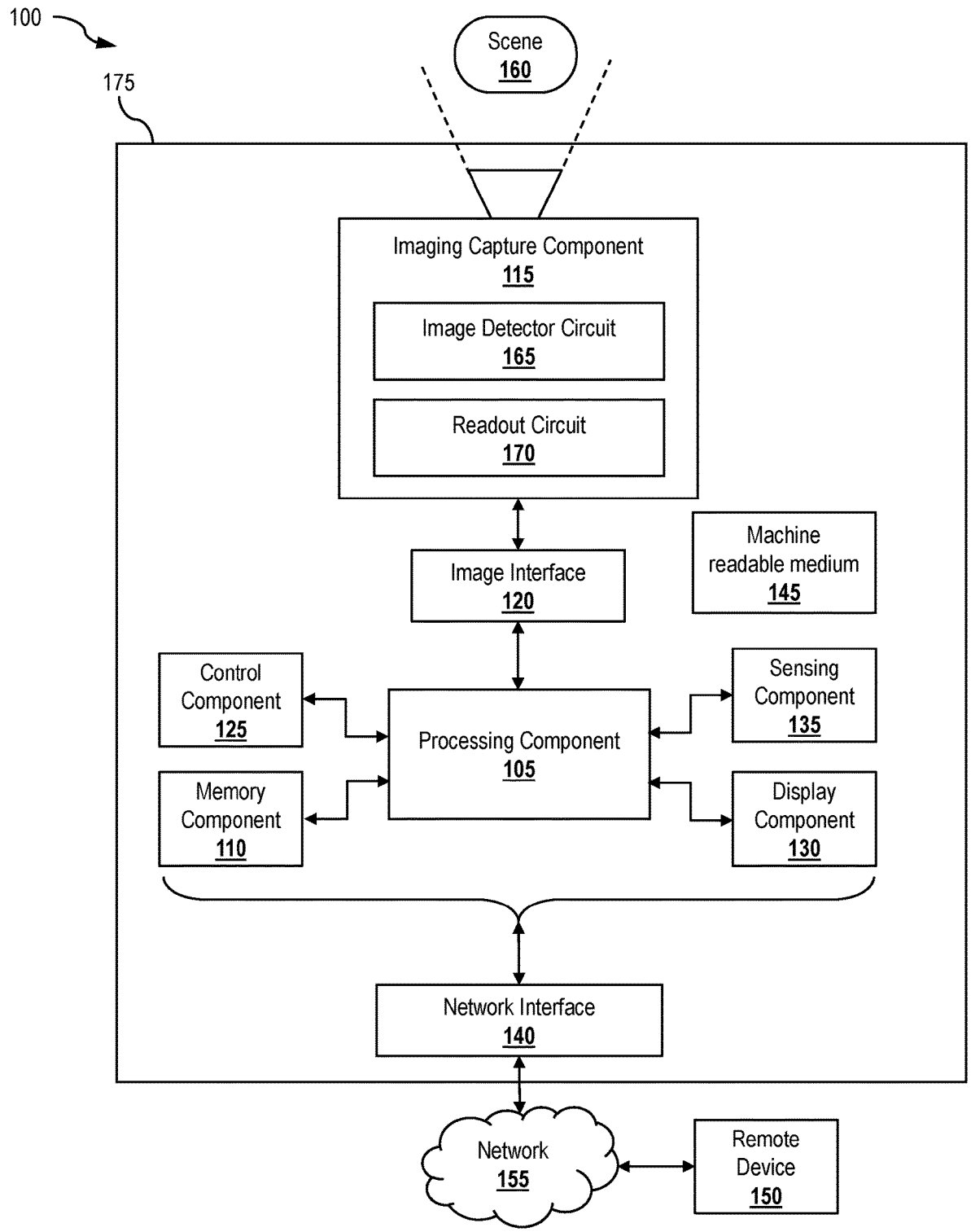
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate control of data rates associated with transmitting images. In some embodiments, an imaging system includes a detector array and a processing circuit. The detector array includes detectors (e.g., also referred to as detector pixels, detector elements, or simply pixels). Each detector pixel detects incident EM radiation and generates image data (e.g., visible-light image data, infrared image data) indicative of the detected EM radiation of a scene. The processing circuit receives the image data from the detector array and generates images based on the captured image data. In some cases, to generate an image, the processing circuit 325 may process image data and generate a header associated with the processed image data. In this regard, an image may include a header and the processed image data. The processed image data may be considered a payload of the image. An image may be referred to as a frame or an image frame. By way of non-limiting examples, a header may include an Ethernet header, an Internet Protocol header, a user datagram protocol (UDP) header, a GigE vision stream protocol (GVSP) header, and/or other header.

Processing of the captured image data may include transforming (e.g., frequency transforming) the image data and/or encoding the image data. Encoding of the image data may include performing a compression scheme on the image data. A compression scheme may be selected to reduce image sizes such that, for a given available bandwidth, the image size can be increased for a given frame transmission rate or the frame transmission rate can be increased for a given image size. Image data may be compressed using spatial compression and/or temporal compression. The image data may be compressed using lossless compression or lossy compression. As an example, compressing of the image data may include spatial compression. The spatial compression may involve encoding a pixel of the image data and a neighboring pixel. For example, for a given pixel, the compression may be based on encoding a difference (e.g., residual) between the pixel and its neighboring pixel (e.g., its previous/left neighboring pixel). In some cases, compression may include a fixed encoding option or an adaptive encoding option. The adaptive encoding option may allow a compression ratio to adapt (e.g., be adjusted) based on a content of a scene. As non-limiting examples, a compression scheme may support a fixed encoding table (e.g., fixed Huffman table) and an adaptive encoding table (e.g., adaptive Huffman table). A compression scheme may be selected by a user, a manufacturer (e.g., a default compression scheme), a standard, and/or others associated with using and/or configuring the imaging system based on application. In this regard, for a given application, the application may be associated with typical types of scenes (e.g., simple scene, complex scene, bright scene, dark scene, motion-filled scene, static scene, etc.) to be imaged for that application.

In some embodiments, the processing circuit may selectively adjust a frame transmission process based on estimated data rates (e.g., determined based on running average of data rates) associated with transmitting images. The frame transmission process may be to have images transmitted over a transmission medium/interface according to a certain frame transmission rate. By way of non-limiting examples, the transmission medium/interface may be an Ethernet interface (e.g., Ethernet GigE interface, Ethernet GigE Vision interface), a Universal Serial Bus (USB) interface, other wired interface, a cellular interface, a Wi-Fi interface, other wireless interface, or generally any wired and/or wireless interface to allow communication of data between the imaging system and another device (e.g., a host device).

An adjustment(s) to the frame transmission process may be based on a data rate(s) (e.g., an estimated data rate(s)) relative to one or more data rate thresholds. In some aspects, the adjustment(s) to the frame transmission process may be in response to a data rate(s) exceeding an upper data rate threshold. In this regard, a data rate is expected to exceed the upper data rate threshold if the frame transmission process is not adjusted (e.g., is left unchanged). In some cases, an estimated data rate may be an estimated instantaneous data rate (e.g., instantaneous bit rate) or an estimated average data rate. The frame transmission process may be adjusted to have the processing circuit drop one or more images (e.g., rather than transmit the image(s) according to the unadjusted frame transmission process) and/or to have the processing circuit transmit images according to a new frame transmission rate.

In some aspects, the processing circuit may receive an indication (e.g., user input) of a frame rate transmission mode. For example, the modes may include a variable frame rate mode or a fixed frame rate mode. In the variable frame rate mode, a frame transmission rate may be increased or decreased to control utilized bandwidth. If a compression (e.g., lossless compression) at a current frame transmission rate is not utilizing at least a certain amount of the bandwidth, an image capturing frame rate of the detector array can be increased and, correspondingly, the frame transmission rate of the processing circuit can be increased. If the compression generates a bandwidth that is higher than the available bandwidth, then the image capturing frame rate of the detector array can be decreased and, correspondingly, the frame transmission rate of the processing circuit can be decreased. In some cases, increasing or decreasing the image capturing frame rate and the frame transmission rate allows efficient utilization of the bandwidth while optimizing (e.g., maximizing) the frame transmission rate given an instantaneous compression ratio.

In the fixed frame rate mode, the user of the imaging system may desire a fixed frame rate (e.g., even if some capacity is lost). In this mode, the image capturing frame rate of the detector array and/or the frame transmission rate of the processing circuit is fixed. One or more images may be dropped when an estimated data rate is higher than the available bandwidth. A new estimated data rate may be determined to allow future images to be sent without the estimated data rate going over the available bandwidth. The dropping of one or more consecutive images may allow smoothing out of compression ratios that result in a higher utilized bandwidth than is available.

Using various embodiments, by selectively adjusting the frame transmission process, a data rate associated with transmitting images over the transmission medium/interface may be controlled such that, for a given bandwidth associated with the transmission medium/interface, an image size can be increased for a given transmission frame rate or the frame transmission rate can be increased for a given image size. For example, a frame transmission rate may be increased without the data rate (e.g., bit rate) exceeding the available bandwidth for varying compression ratios. Transmission of as many images (e.g., containing compressed image data or uncompressed image data) as feasible while remaining within a data rate range and/or below an upper data rate threshold may facilitate various applications, such as machine vision applications. Machine vision applications may in turn be part of safety applications, such as intruder detection, fire detection, temperature prediction, and/or others. In some cases, various machine vision applications may use lossless compressed image data. Such image transfer may facilitate analysis of the scene by a user(s) of the imaging system and/or by circuitry of the imaging system and/or other machine(s). In some cases, the frame transmission rate may be adjusted to keep or bring a data rate (e.g., an average data rate) close to a desired/target data rate.

Although various embodiments for data rate control for image transmission are described with respect to visible-light imaging or infrared imaging (e.g., thermal infrared imaging), data rate control may be applied to image data of other wavebands and/or transmission of other data in general. Various embodiments of methods and systems disclosed herein may be included in or implemented as various devices and systems such as visible-light imaging systems, infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera, a visible-light camera, a tablet computer, a laptop, a personal digital assistant (PDA), a mobile device, a desktop computer, or other electronic device) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent a housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, data transformation, data compression, video analytics, etc.). In one case, image data may be compressed using an FPGA of the processing component 105.

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. In one or more embodiments, such instructions, when executed by the processing component 105, may cause the imaging system 100 to perform operations to generate images based on image data, transmit the images, and selectively adjust processes related to frame transmission for data rate control. The processing component 105 and/or the image interface 120 may be configured to store in the memory component 110 images or digital image data captured by the image capture component 115, encoding tables (e.g., fixed Huffman tables, adaptive Huffman tables), and/or other data.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes the image detector circuit 165 (e.g., a visible-light detector circuit, a thermal infrared detector circuit) and the readout circuit 170 (e.g., an ROIC). For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 μm to 5 μm), and/or long-wave IR (LWIR) radiation (e.g., EM radiation with wavelength of 7 μm to 14 μm), or any desired IR wavelengths (e.g., generally in the 0.7 μm to 14 μm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 160. To capture a detector output image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 160, with each pixel having a pixel value that represents EM radiation emitted or reflected from a portion of the scene 160 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be a visible-light image. In another example, the detector output image may be an infrared image (e.g., thermal infrared image). For a thermal infrared image (e.g., also referred to as a thermal image), each pixel value of the thermal infrared image may represent a temperature of a corresponding portion of the scene 160.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., detector output images per second) at which images are detected/output in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. In an aspect, the image interface 120 may include a serial interface and telemetry line for providing metadata associated with image data. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

The image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera. In one embodiment, the control component 125 may allow a user to select a data rate control mode, such as a variable frame transmission rate mode or a fixable frame transmission rate mode.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105. In some aspects, the control component 125 may be implemented as part of the display component 130. For example, a touchscreen of the imaging system 100 may provide both the control component 125 (e.g., for receiving user input via taps and/or other gestures) and the display component 130 of the imaging system 100.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
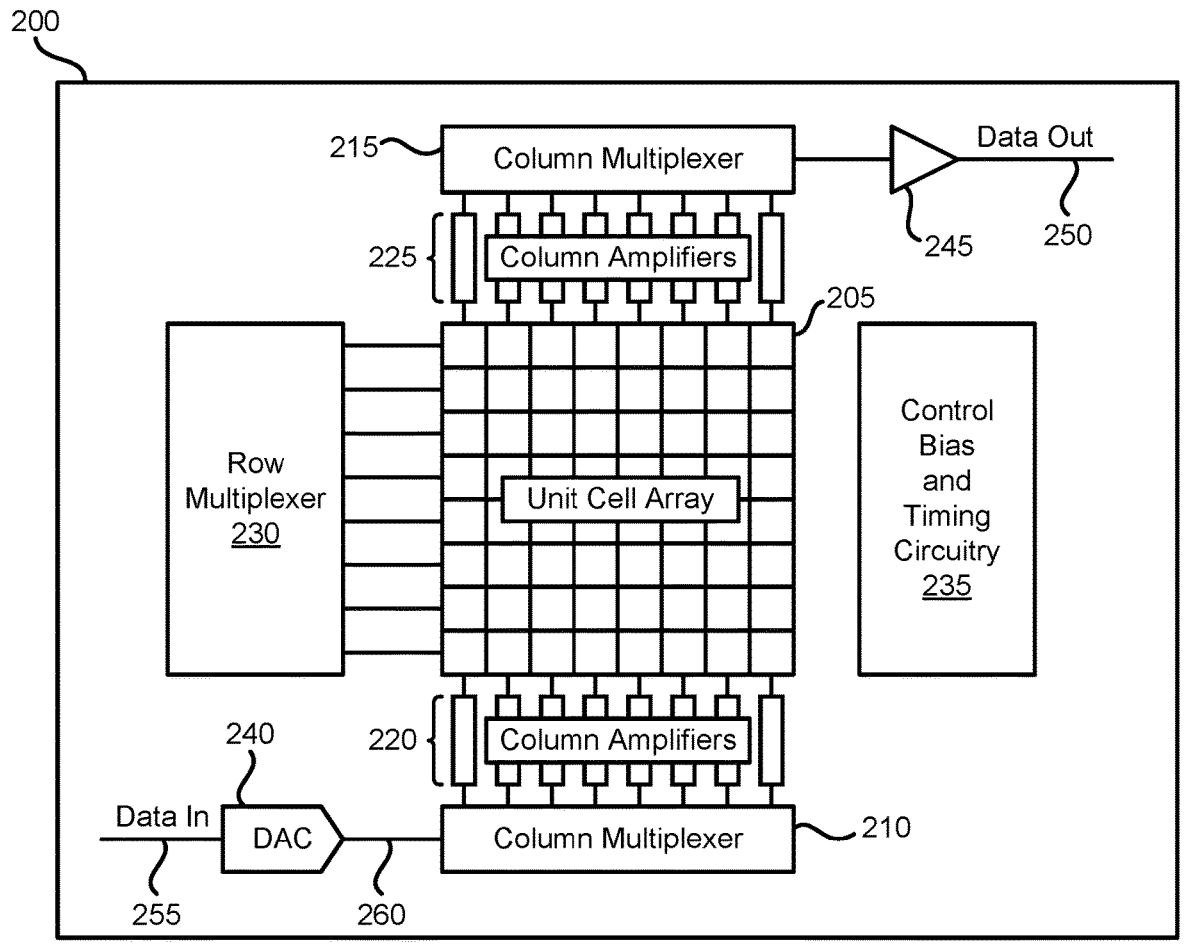
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215. In an embodiment, the column amplifiers 225 may include a processor for processing (e.g., compressing, transforming, etc.) digital signals.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or image capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., FFC or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of image capturing frame rates and/or frame transmission rates may include 30 Hz, 60 Hz, and 120 Hz, although in various embodiments such frame rates may be changed. In an aspect, each unit cell of the unit cell array 205 may represent a pixel.

Figure 3:
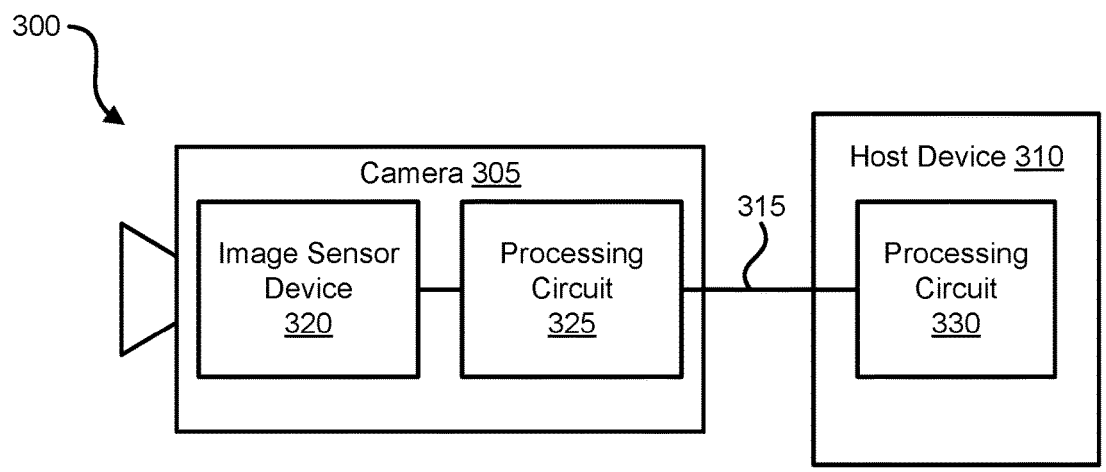
FIG. 3 illustrates an example network environment in which image data is acquired and processed and the processed image data communicated in accordance with one or more embodiments of the present disclosure.

FIG. 3 illustrates an example network environment 300 in which image data is acquired and processed (e.g., compressed and/or transformed) and the processed image data communicated in accordance with one or more embodiments of the present disclosure. Not all of the depicted components in FIG. 3 may be required, and one or more embodiments may include additional components not shown in the figure. Variations in the arrangement and type of the components may be made without departing from the spirit or scope of the claims as set forth herein. Additional components, different components, and/or fewer components may be provided.

The network environment 300 includes a camera 305, a host device 310, and an interface 315 to facilitate communication between the camera 305 and the host device 310. In an embodiment, the camera 305 may be, may include, or may be a part of the portion 175 of the imaging system 100; the host device 310 may be, may include, or may be a part of the remote device 150; and/or the interface 315 may be, may include, or may be a part of the network interface 140 and the network 155.

The camera 305 includes an image sensor device 320 and a processing circuit 325. In an embodiment, the image sensor device 320 may be, may include, or may be part of the imaging capture component 115, and/or the processing circuit 325 may be, may include, or may be a part of the processing component 105. The image sensor device 320 captures image data. The processing circuit 325 receives the image data from the image sensor device 320 and generates images based on the captured image data. In some cases, to generate an image, the processing circuit 325 may process image data and generate a header associated with the processed image data. An image may include a header and the processed image data. The processed image data may be considered a payload of the image. By way of non-limiting examples, a header may include an Ethernet header, an Internet Protocol header, a UDP header, a GVSP header, and/or other header. For a given image, header information may include an image number, a packet number, a timestamp, a compression scheme used to compress the image data, a payload size (e.g., in bytes), media access control (MAC) addresses, source and destination port numbers, and/or checksums. In some cases, processing of the captured image data may include encoding (e.g., compressing) the image data. In some cases, compressing of the captured image data may include generating residual image data based on spatial or temporal differences between pixels. For example, the residual image data may be determined from the captured image data and then the residual image data may be encoded to obtain the processed image data.

The camera 305 transmits the images over the interface 315 to the host device 310. The interface 315 may include appropriate ports, connectors, switches, antennas, circuitry, and/or generally any other components of the camera 305 and the host device 310 for facilitating communication between the camera 305 and the host device 310. In some embodiments, the interface 315 may be an Ethernet interface (e.g., Ethernet GigE interface, Ethernet GigE Vision interface), a USB interface, other wired interface, a cellular interface, a Wi-Fi interface, other wireless interface, or generally any interface to allow communication of data between the camera 305 and the host device 310.

The images may be transmitted via a frame transmission process. The frame transmission process may include transmitting images according to a frame transmission rate (e.g., in Hz or frames per second). The frame transmission rate may also be referred to simply as a frame rate. In some cases, an image capturing frame rate at which images are detected/output in a sequence by the image sensor device 320 may be based at least in part on the frame transmission rate (e.g., a rate at which images are output by the processing circuit 325 to the host device 310). A frame duration is the amount of time between transmitted images (e.g., in seconds) and thus is an inverse of the frame transmission rate. For a given image, its duration is a time distance to a next image. A frame size is a size of an image represented in bits, bytes, or other measures of data amount.

The host device 310 receives the images (e.g., encoded images) from the camera 305 via the interface 315. A processing circuit 330 of the host device 310 processes (e.g., decodes) the images from the camera 305. Processing performed by the processing circuit 330 may generally correspond at least in part to processing performed by the processing circuit 325 of the camera 305. In some cases, the processing circuit 330 may break up an image into segments and decode each segment independently of each other (e.g., to speed up decoding). The decoded images may be provided by the processing circuit 330 for storage, display, and/or further processing.

As provided above, in some embodiments, the processing circuit 325 may generate an image by compressing image data captured by the image sensor device 320. A compression scheme may be selected to reduce image sizes such that, for a given available bandwidth, the image size can be increased for a given frame rate or the frame rate can be increased for a given image size. Image data may be compressed using spatial compression and/or temporal compression. The image data may be compressed using lossless compression or lossy compression. In some cases, lossless compression may allow more data to transfer from the camera 305 to the host device 310 without image quality degradation. The lossless compression may include entropy encoding. For example, the lossless compression may include Huffman encoding. A given compression scheme (e.g., spatial compression scheme, temporal compression scheme, compression scheme applied to transformed data, and/or combination thereof) may achieve higher compression ratios over other compression schemes for certain scenarios/scenes (e.g., hot scenes, cold scenes, scenes having lots of motion, etc.). In an aspect, a compression ratio A:B for an image denotes that an uncompressed size of the image has a size A and a compressed size of the image has a size B. Such an image size may be provided as a number of bits, a number of bytes, and/or generally any other measurement of data size.

In some cases, compression may include a fixed encoding option or an adaptive encoding option. The adaptive encoding option may allow a compression ratio to adapt (e.g., be adjusted) based on a content of a scene. As non-limiting examples, a compression scheme may support a fixed encoding table (e.g., fixed Huffman table) and an adaptive encoding table (e.g., adaptive Huffman table). For a given image to be compressed, the adaptive encoding table to apply to the given image may be based on content of (e.g., scene information from) images that precede the given image. In some cases, utilizing an encoding table adaptive to the scene may generally allow for higher compression ratios (e.g., a ratio of an uncompressed size to a compressed size). Data indicative of the compression scheme (e.g., encoding table) may be provided, such as in a header of the compressed data.

As an example, a lossless image compression scheme may provide a compression ratio of around 2:1, although the compression ratio may vary greatly depending on image complexity. As such, for a given available bandwidth for a transmission medium/interface, compressing of image data allows for a frame transmission rate to be increased according to the compression ratio associated with the image data relative to a case in which the image data is left uncompressed, thus allowing users to achieve higher frame transmission rates. For example, an average compression ratio of around 2:1 for image data allows around, on average, twice as much image data to be transmitted and thus around twice the data throughput relative to a case in which the image data is left uncompressed.

A compression scheme may be selected by a user, a manufacturer (e.g., a default compression scheme), a standard, and/or others associated with using and/or configuring the network environment 300. In some cases, a user may be provided with a user interface (e.g., with fields such as drop-down menus, radio buttons, etc.) for the user to set parameters (e.g., no compression, lossless or lossy, spatial compression, and/or temporal compression) to define a desired compression scheme and/or select from one of multiple lossless compression schemes, lossy compression schemes, fixed compression schemes, adaptive compression schemes, and/or others.

Such a selection may be based on application. In this regard, for a given application, the application may be associated with typical types of scenes (e.g., simple scene, complex scene, bright scene, dark scene, motion-filled scene, static scene, etc.) to be imaged for that application. Temporal compression (e.g., temporal lossless compression) may encode a pixel difference between a current image and a previous image. As an example, for predominantly static scenes, changes between the current image and the previous image may be small, resulting in a higher compression ratio if the selected compression scheme includes temporal compression. As another example, for a moving camera, changes between the current image and the previous image may be large, resulting in a lower compression ratio if temporal compression is used. In an example machine vision application where a stationary camera is performing inspection of a static scene, the user can select temporal lossless compression. In mobile camera scenarios, the user can select spatial lossless compression. In other cases, a combination of temporal compression and spatial compression may be performed.

In some cases, image data may be transformed to (e.g., converted to, represented in) the frequency domain, this transformed image data may be compressed, and this compressed image data may be transmitted (e.g., to be decoded by the host device 310). In some cases, transformation and compression of image data may allow for a higher compression ratio than when the transformation or compression alone is performed. In an aspect, an image may include uncompressed and/or untransformed image data. For a given frame transmission rate, transmitting image data (e.g., as part of an image) without compressing the image data may be associated with higher data rate (e.g., due to a larger image) and lower processing overhead (e.g., due to lack of compression operations).

In an aspect, the processing circuit 325 may implement lossless compression. For example, the lossless compression may involve entropy encoding, such as Huffman encoding. In some cases, the compression may include spatial compression. For example, the spatial compression may involve encoding a pixel of the image data and a neighboring pixel. For example, the compression may be based on encoding a difference (e.g., residual) between the pixel and its neighboring pixel (e.g., its previous/left neighboring pixel). In an aspect, the compression may encode a series of symbols to a bitstream, in which more probable symbols may generally be encoded with shorter binary codewords and less probable symbols may generally be encoded with longer binary codewords. The symbol may be formed by taking a value of a pixel minus a value of a neighboring pixel, with smaller pixel differences encoded with fewer bits.

As one example, the processing circuit 325 of the camera 305 may generate residual image data (e.g., using a spatial or temporal difference image) based on the image data and perform a transformation (e.g., a frequency transformation) to obtain transformed image data. In this regard, to encode the image data captured by the image sensor device 320 to obtain encoded image data, the processing circuit 325 may generate residual image data, transform (e.g., frequency transform) the residual image data, and entropy encode (e.g., Huffman encode) the transformed image data to obtain the encoded image data. The processing circuit 325 may generate an image that includes a header and the encoded image data. The processing circuit 325 may then transmit the image over the interface 315 to the host device 310. The processing circuit 330 of the host device 310 processes the image to obtain decoded image data. In some cases, the decoded image data may be a reconstruction of the image data captured by the image sensor device 320. To decode the image, the processing circuit 330 may entropy decode (e.g., Huffman decode) the image, inverse transform the entropy decoded image, and then reconstruct the image data (e.g., by following/reversing operations used to get the residual image data). In some aspects, the processing circuit 325 of the camera 305 may leave the image data uncompressed and/or untransformed, in which case the processing circuit 330 of the host device 310 does not perform decompression and/or transformation. In this example, the transformation may increase the compression ratio associated with the image data (e.g., relative to a case that the image data is compressed and not transformed). In a case that Huffman encoding is used, a frequency transformation may improve an efficiency of the Huffman encoding. In some cases, such as for use in conjunction with lossless compression, the transformation is a non-destructive transformation where an inverse transformation preserves the captured image data.

In some embodiments, the processing circuit 325 of the camera 305 may selectively adjust the frame transmission process based on estimated data rates (e.g., determined based on running average of data rates) associated with transmitting images. The frame transmission process may be adjusted to instruct the processing circuit 325 to drop an image (e.g., rather than transmit the image according to the frame transmission rate) and/or to instruct the processing circuit 325 to transmit images according to a new frame transmission rate. In some cases, the frame transmission rate may be adjusted to keep or bring a data rate (e.g., an average data rate) close to a desired/target data rate. An adjustment (s) to the frame transmission process may be in response to an estimated data rate(s) exceeding an upper data rate threshold (e.g., also referred to as a maximum data rate threshold). In this regard, a data rate is expected to exceed the upper data rate threshold if the frame transmission process is not adjusted. In some cases, an estimated data rate may be an estimated instantaneous data rate (e.g., instantaneous bit rate). The estimated instantaneous data rate may be determined by dividing a size of a current image by its frame duration.

As non-limiting examples, the upper data rate threshold may be implemented as an instantaneous upper data rate threshold or an average upper data rate threshold. In some embodiments, the upper data rate threshold may be set with the expectation that it is generally not to be exceeded. In some cases, the upper data rate threshold may be set by a user, a manufacturer(s) (e.g., of the camera 305, the interface 315, and/or the host device 310), a standard, and/or others associated with using and/or configuring the network environment 300. The upper data rate threshold may generally be based at least in part on an available bandwidth of the interface 315 through which images and/or other data are transmitted. In some cases, the bandwidth may be, or may be referred to as, an interface speed. In some cases, the predetermined data rate threshold may also be based on a maximum throughput of the camera 305 and/or the host device 310. The maximum throughput may be based on image capture capability, image processing capability (e.g., processing speed), and/or other capabilities of the camera 305 and/or the host device 310.

In some cases, the upper data rate threshold is based on the available bandwidth of an interface/connection (e.g., the interface 315) through which images are transmitted. As one example, if a camera (e.g., the camera 305) can use an entire bandwidth of an interface (e.g., a USB interface) available for transmitting images, the upper data rate threshold may be set at a level that utilizes as much of the available bandwidth as possible (e.g., 90% of the available bandwidth). As another example, if multiple cameras share this bandwidth, an upper data rate threshold of each camera may be a fraction of the bandwidth of the interface/connection. Each camera may have a respective upper data rate threshold.

In an aspect, a current data rate may be determined based on a size of an image and a current frame transmission rate. In some cases, the image may include compressed image data. In these cases, a size of the compressed image data may be determined once the compressed image data has been generated and this size (e.g., along with header size) can then be used to determine (e.g., estimate) the data rate associated with the image. In some cases, the data rate may be determined using an averaging algorithm appropriate from a dynamic nature of the data rate change. The averaging algorithm may be a moving average (e.g., weighted moving average) of the data rates associated with transmitting images. The averaging may be a smoothing step and may be referred to as a smoothing function. In some cases, the averaging algorithm may be appropriate to respond (e.g., rapidly respond) to increases in data rate to avoid an increase in instantaneous data rate that could overload the transmission medium/interface and result in loss of data (e.g., packet loss). In some cases, a response of the averaging algorithm to a decrease in the data rate may be lower than its response to an increase in the data rate, since a decrease in the data rate may result in lost capacity, which is generally more tolerable than overloading the transmission medium/interface. A determination of whether to adjust an estimated data rate associated with transmitting a next image may be based on determining whether the estimated data rate is higher or lower than the available bandwidth.

In some embodiments, the camera 305 may provide a user with multiple data rate control modes. Each data rate control mode may indicate how a frame transmission process is adjusted. In some embodiments, the data rate control modes include a variable frame rate mode and a fixed frame rate mode. In some cases, for the fixed frame rate mode, the frame transmission rate may be maintained at a fixed rate except when images are being dropped. In some aspects, such as for lossy compression, a data rate control mode may allow compression ratio to be dropped (e.g., data lost) to reduce data rate.

Figure 4:
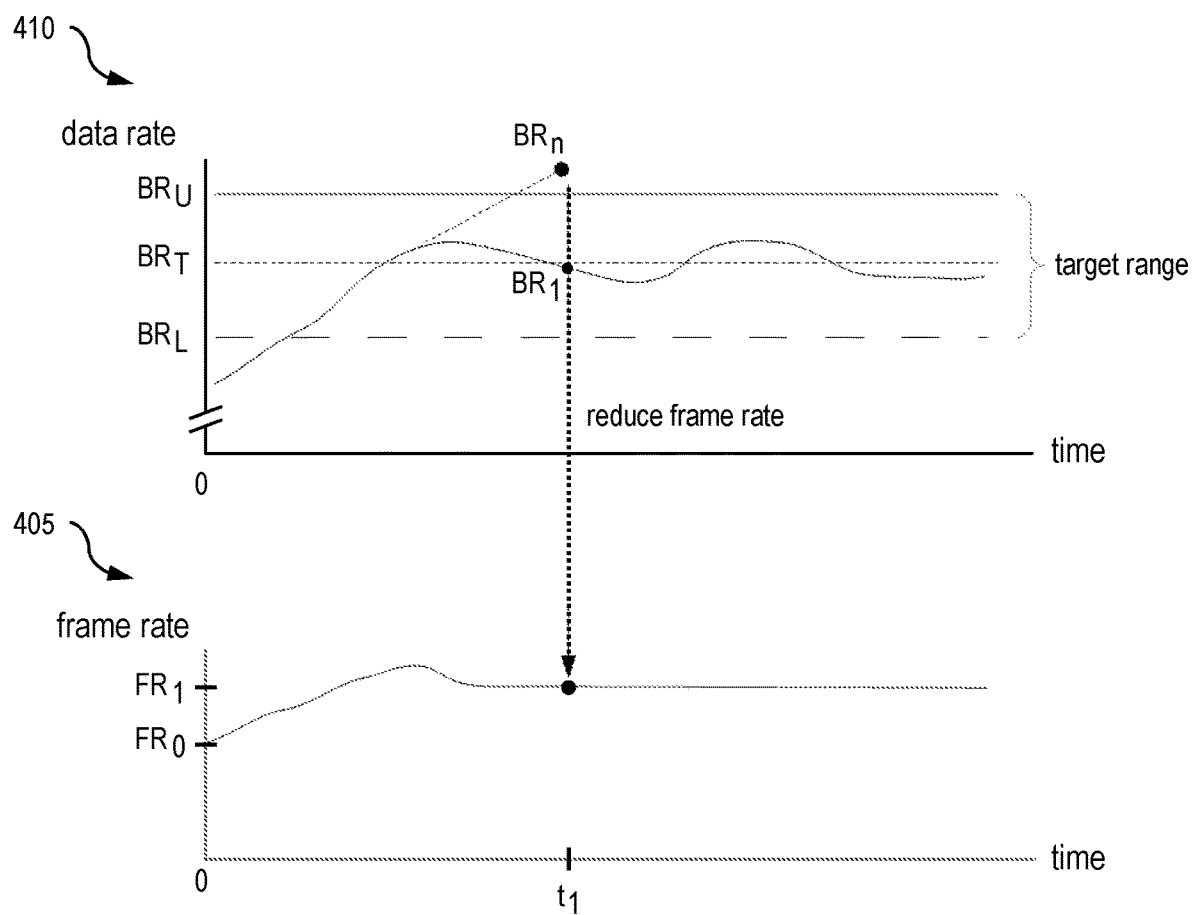
FIG. 4 illustrates graphs of a frame transmission rate and a data rate over time in accordance with one or more embodiments of the present disclosure.

FIG. 4 illustrates graphs 405 and 410 of a frame transmission rate and a data rate (e.g., bit rate), respectively, over time in accordance with one or more embodiments of the present disclosure. In some embodiments, FIG. 4 illustrates operation of an imaging device (e.g., the camera 305) in a variable frame rate mode. Although FIG. 4 is described primarily with reference to the camera 305 of FIG. 4, other cameras may have operating characteristics that follow the graphs 405 and 410 of FIG. 4. Furthermore, although FIG. 4 is described with reference to frame transmission rates, a relationship between an image capturing frame rate of a sensor (e.g., the image sensor device 320) and the data rate may follow a similar relationship as that shown in FIG. 4.

As shown in the graph 410, a data rate may be above an upper data rate threshold $BR_U$, below a lower data rate threshold $BR_L$, or between the upper data rate threshold $BR_U$ and the lower data rate threshold $BR_L$. A data rate range between the upper data rate threshold $BR_U$ and the lower data rate threshold $BR_L$ may be referred to as a target data rate range. As shown in the graph 405, the frame transmission rate at a certain moment in time is associated with a corresponding data rate at that moment in time. In some cases, for a given moment in time, the data rate at this moment is determined based on the frame transmission rate for this moment and an image transmitted at this moment.

In FIG. 4, at an initial time t=0, a sensor (e.g., the image sensor device 320) has an image capturing frame rate set based on an initial frame transmission rate $FR_0$. For example, the initial time may refer to a time associated with transmission of a first image (e.g., from the camera 305 to the host device 310) after power on. The frame transmission rate $FR_0$ may be specified by a user, a manufacturer of an imaging system or portion thereof (e.g., as a default frame transmission rate), and/or others associated with using and/or configuring (e.g., for a certain application) the imaging system (e.g., the camera 305 and/or the host device 310). Since the frame transmission rate $FR_0$ is low (e.g., below the lower data rate threshold $BR_L$), the frame transmission rate $FR_0$ is adjusted to increase the frame transmission rate such that the data rate corresponding to the adjusted frame transmission rate increases toward the target data rate and is expected to lie between $BR_L$ and $BR_U$. In this regard, the initial frame transmission rate $FR_0$ may be set to a lower level such that the corresponding data rate is generally below the upper data rate threshold $BR_U$ and the frame transmission rate can then ramp up toward a target data rate $BR_T$ over time. In some cases, the target data rate $BR_T$ may be set to a midpoint between $BR_U$ and $BR_L$. Setting the target data rate $BR_T$ at the midpoint allows a generally higher probability that an expected data rate falls within the target range relative to cases in which the target data rate is not set at the midpoint. In some cases, the target data rate $BR_T$ is not set at the midpoint. For example, in some applications, the target data rate $BR_T$ may be set higher than the midpoint so that the data rate skews toward a higher data rate closer to $BR_U$. The target data rate $BR_T$ may be considered a reference data rate to which a data rate is driven towards when frame transmission rate adjustment is performed.

Although, in FIG. 4, the frame transmission rate $FR_0$ at the initial time corresponds to a data rate below the lower data rate transmission $BR_L$, the frame transmission rate $FR_0$ at the initial time may be set (e.g., based on a prior image transfer session) to a higher frame transmission rate, such as one expected to correspond to a data rate between $BR_U$ and $BR_L$. For example, this higher frame transmission rate may be one that is determined (e.g., estimated) to correspond to a data rate at or near the target data rate.

A data rate associated with transmitting an image at $t=t_1$ is expected to at a data rate $BR_n$, which is higher than the upper data rate threshold $BR_U$. For example, scene changes around and prior to $t=t_1$ may be associated with a lower compression ratio than the scene earlier on. In this regard, an image scene may change over time and cause a change in a compression ratio, with such a change in the compression ratio being associated with a corresponding change in an image size. The lower compression ratio may be associated with an increase in a size (e.g., in bits/bytes) of an image and, for a given frame transmission rate, an increase in the data rate (e.g., increase in utilized bandwidth) associated with transmitting the image, as shown by the data rate $BR_n$. The frame transmission rate may be decreased to avoid the data rate reaching the expected data rate $BR_n$ if the frame transmission rate were to be left unchanged. In FIG. 4, the frame transmission rate is decreased such that the frame transmission rate is $FR_1$ at $t=t_1$. With the frame transmission rate at $FR_1$, the data rate at $t=t_1$ is at a data rate $BR_1$ that is within the target data rate range and driven toward the target data rate $BR_T$ (e.g., relative to the data rate $BR_n$ if the frame transmission rate is not adjusted). As shown in FIG. 4, the data rate remains within the target data rate range around and subsequent to $t=t_1$, and thus the frame transmission rate is maintained at $FR_1$. If an expected data rate were to fall outside the target range after $t=t_1$ (not shown in FIG. 4), a new frame transmission rate may be determined based on the target data rate and used for one or more subsequent images.

In an aspect, the lower data rate threshold $BR_L$ may be referred to as a hysteresis boundary. The hysteresis boundary may be set to a data rate level appropriate to avoid frequent adjustments to the frame transmission rate. In some cases, frequent adjustments and/or large adjustments to the frame transmission rate may adversely affect user perception of the images and/or analyzing/processing of the images. In some cases, the hysteresis boundary may be set by a user, a manufacturer (e.g., a default lower bound), a standard, and/or others associated with using and/or configuring the network environment 300. The hysteresis boundary may be set based on application and/or an expected scene to be captured by the sensor. In cases that a user or an application desires that a frame transmission rate is at as high a level as possible, the hysteresis boundary may be set at the upper data rate threshold $BR_U$ such that the frame transmission rate is increased whenever the data rate is below the upper data rate threshold (e.g., or equivalently below the hysteresis boundary).

In an embodiment, the target range (e.g., the upper and lower data rate thresholds) may be chosen such that the frame transmission rate remains stable with small changes in scene complexity (e.g., generally associated with small changes in complexity ratio). In some cases, the target range may be a user specified range based on an expected variability in compression ratio of captured image data (e.g., which is generally application dependent). In general, defining of a frame transmission rate generally also defines an image capturing frame rate. A setting of the image capturing frame rate sets image acquisition times (e.g., times at which the image sensor device 320 is to capture image data).

Figure 5:
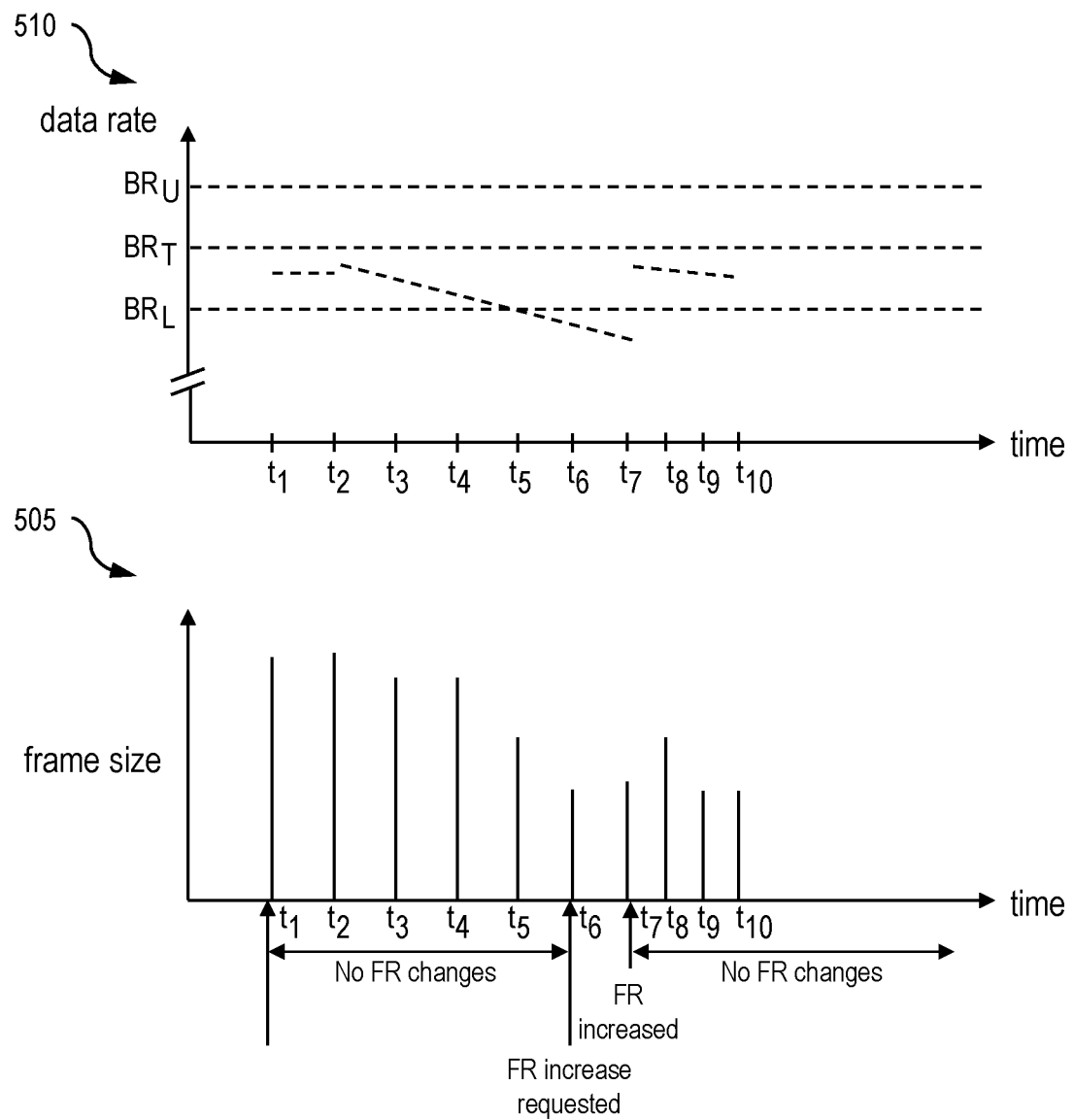
FIGS. 5 and 6 each illustrate a graph illustrating a size of images transmitted over time with variable frame rate and a graph illustrating corresponding estimated data rates associated with transmitting these images in accordance with one or more embodiments of the present disclosure.
Figure 6:
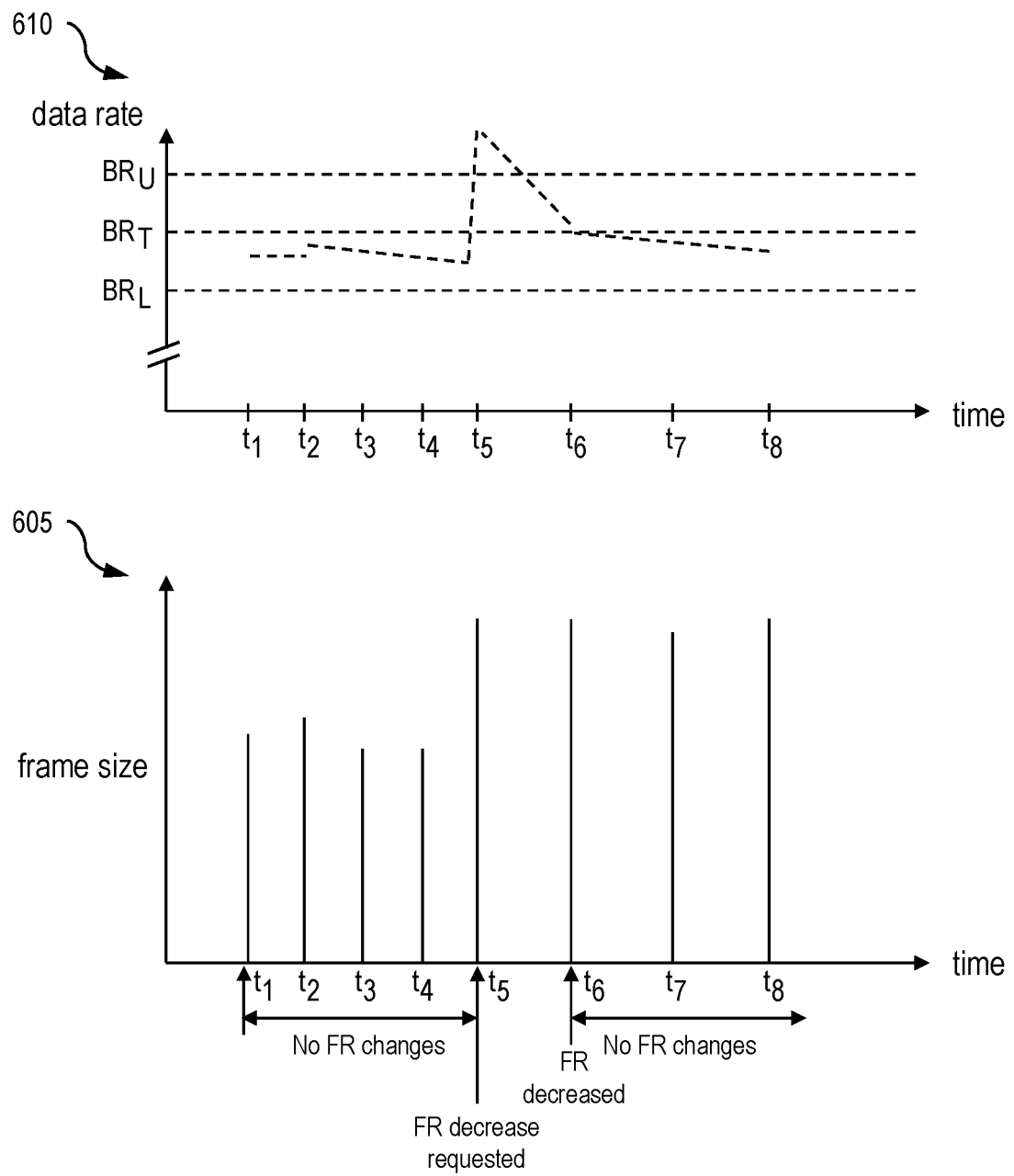

While FIG. 4 illustrates a general relationship (e.g., an analog/continuous-time relationship) between the frame transmission rate and the data rate over time, FIGS. 5 and 6 illustrate example graphs showing relationships between an image size, a frame transmission rate, and a data rate on a frame-by-frame basis in accordance with one or more embodiments. FIG. 5 illustrates a graph 505 illustrating a size (e.g., bit size) of images transmitted over time with variable frame rate and a graph 510 illustrating corresponding estimated data rates associated with transmitting these images. Images are sent at $t=t_1, t_2, t_3, t_4, t_5, t_6, t_7, t_8, t_9$, and $t_{10}$. Solid vertical lines in the graph 505 represent the image size for the current image frame. For example, the solid vertical line at $t=t_3$ is taller than the solid vertical line at $t=t_5$ to represent that the image size for the image sent at $t=t_3$ is larger than the image size for the image sent at $t=t_5$. Hashed lines in the graph 410 represent estimated data rates.

In FIG. 5, the frame rate adjustment is represented by varying time duration between transmissions of temporally adjacent images. In this regard, the image sent at $t_2$ may be referred to as a temporally adjacent image of the images sent at $t_1$ and $t_3$. In an aspect, a time duration between temporally adjacent images may be referred to as a frame duration or a frame period. Since the data rate is within the target range until between time $t_5$ and $t_6$, the images transmitted at time $t_1$ through $t_7$ are transmitted according to the same frame rate. At $t=t_6$, a request may be made (e.g., an instruction may be generated, a flag may be set) to increase the frame transmission rate (e.g., of the processing circuit 325) may be increased (e.g., a time duration between temporally adjacent images decreased) for subsequently transmitted images. The request may be responsive to an expected data rate being lower than the lower data rate threshold (e.g., the hysteresis boundary) between $t_5$ and $t_6$. In some cases, the processing circuit 325 of the camera 305 may set the frame transmission rate of the processing circuit 325 and the image capturing frame rate of the image sensor device 320. As shown in FIG. 5, such a decrease in the data rate may be due to a decrease in the image size (e.g., the image associated with $t_4$ is larger than the image associated with $t_5$ and similarly the image associated with $t_5$ is larger than the image associated with $t_6$). For example, such a decrease in the image size may be due to a scene change to a scene associated with, for example, lower complexity (e.g., allowing for a higher compression ratio). In this regard, the frame transmission rate is increased by around $t=t_7$ such that the image transmitted at $t=t_8$ is according to this increased frame transmission rate. This increased frame transmission rate is maintained such that images transmitted at $t=t_8, t_9$, and $t_{10}$ are according to this increased frame transmission rate. The increase in the frame transmission rate increases the expected data rate to a level within the target range.

FIG. 6 illustrates a graph 605 illustrating a size of images transmitted over time with variable frame rate and a graph 610 illustrating corresponding estimated data rates associated with transmitting these images. Images are sent at $t=t_1, t_2, t_3, t_4, t_5, t_6, t_7$, and $t_8$. The description of FIG. 5 generally applies to FIG. 6, with examples of differences between FIG. 5 and FIG. 6 and other description provided herein. Since the data rate is within the target range until around $t_5$, the images transmitted at time $t_1$ through $t_5$ are transmitted according to the same frame rate. At $t=t_5$, a request may be made to decrease the frame transmission rate (e.g., a time duration between temporally adjacent images increased) for subsequently transmitted images. The request may be responsive to an expected data rate being higher than the upper data rate threshold at around $t_5$. As shown in FIG. 6, such an increase in the expected data rate is due in part to an increase in the image size in which the image associated with $t_5$ is larger than the image associated with $t_4$. The frame transmission rate is decreased such that the image transmitted at $t=t_6$ is according to this decreased frame transmission rate. In this regard, a time duration between the images transmitted at $t=t_5$ and $t=t_6$ is shorter than a time duration between the images transmitted at $t=t_6$ and $t=t_7$. This decreased frame transmission rate is maintained such that images transmitted at $t=t_6, t_7$, and $t_8$ are according to this decreased frame transmission rate. The decrease in the frame transmission rate decreases the expected data rate to a level within the target range. In some embodiments, FIGS. 5 and 6 illustrate operation of an imaging device (e.g., the camera 305) in a variable frame rate mode.

Although FIGS. 5 and 6 provide examples in which the frame transmission rate may be adjusted (e.g., reduced to decrease a data rate), in some embodiments, one or more images may be dropped in addition to adjusting the frame transmission rate. As one example, one or more images may be dropped in addition to reducing the frame transmission rate. As another example, one or more images may be dropped and the frame transmission rate increased (e.g., due to available bandwidth from dropping the image(s)).

In some embodiments, image transmission may be transmitted according to a fixed frame transmission rate except at instances when one or more images may be dropped. The data rate associated with transmitting an image (e.g., containing compressed image data) may be determined (e.g., predicted). The fixed frame transmission rate may be specified by a user, a manufacturer (e.g., a default transmission rate), and/or others associated with using and/or configuring the network environment 300. An image may be selectively transmitted based on an expected data rate and a data rate threshold. In some cases, an averaging algorithm may be used to determine the estimated data rate using a size of a next image and determine if the estimated data rate is above the data rate threshold. If the estimated data rate is above the data rate threshold, one or more images may be dropped. In this regard, images may be dropped until an estimated data rate is below the data rate threshold.

Figure 7:
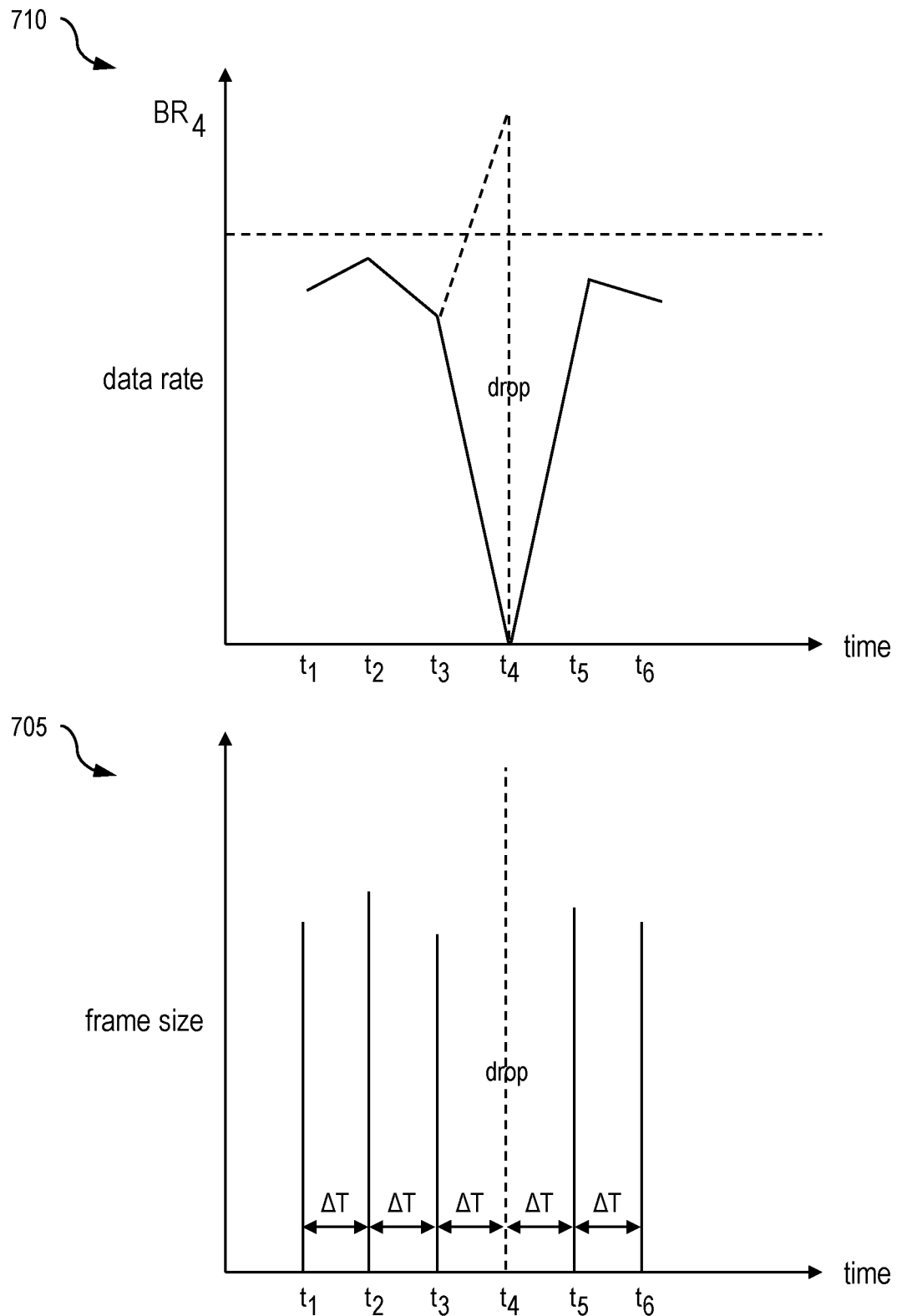
FIGS. 7 and 8 each illustrate a graph illustrating a size of images transmitted over time according to a fixed frame rate and a graph illustrating corresponding estimated data rates associated with transmitting these images in accordance with one or more embodiments of the present disclosure.

As an example, FIG. 7 illustrates a graph 705 illustrating a size of images transmitted over time according to a fixed frame transmission rate and a graph 710 illustrating corresponding estimated data rates associated with transmitting these images in accordance with one or more embodiments of the present disclosure. Images are sent at t=$t_1$, $t_2$, $t_3$, $t_5$, and $t_6$. A frame duration between temporally adjacent images is denoted as $\Delta T$ and remains constant between $t_1$ and $t_2$, $t_2$ and $t_3$, and $t_5$ and $t_6$. A frame duration between temporally adjacent images at $t_3$ and $t_5$ is twice (i.e., $\Delta T$) that of the frame duration between the other temporally adjacent images. The image at $t_4$ is represented as a hashed vertical line, with a height of the hashed vertical line indicating the size of the image at $t_4$. The increased image size at time $t_4$ has a corresponding estimated data rate (denoted as $BR_4$ in the graph 610) that is above the data rate threshold. To decrease the estimated data rate, the image at $t_4$ is dropped, as represented using the hashed vertical line at $t_4$. The dropping of the image at $t_4$ causes a decrease in the estimated data rate for frame time $t_5$ and allow/resume transmission according to the fixed frame transmission rate by transmitting the image at frame time $t_5$. In some cases, an estimated data rate for frame time $t_5$ may be determined with the image size for frame time $t_4$ being zero. It is noted that, while the frame rate between frame time $t_3$ and $t_5$ is lower than the fixed frame rate (e.g., or equivalently the frame duration between frame time $t_3$ and $t_5$ is greater than $\Delta T$), the frame rate is half the fixed frame rate and is known to the user and thus can be considered a fixed frame rate.

Figure 8:
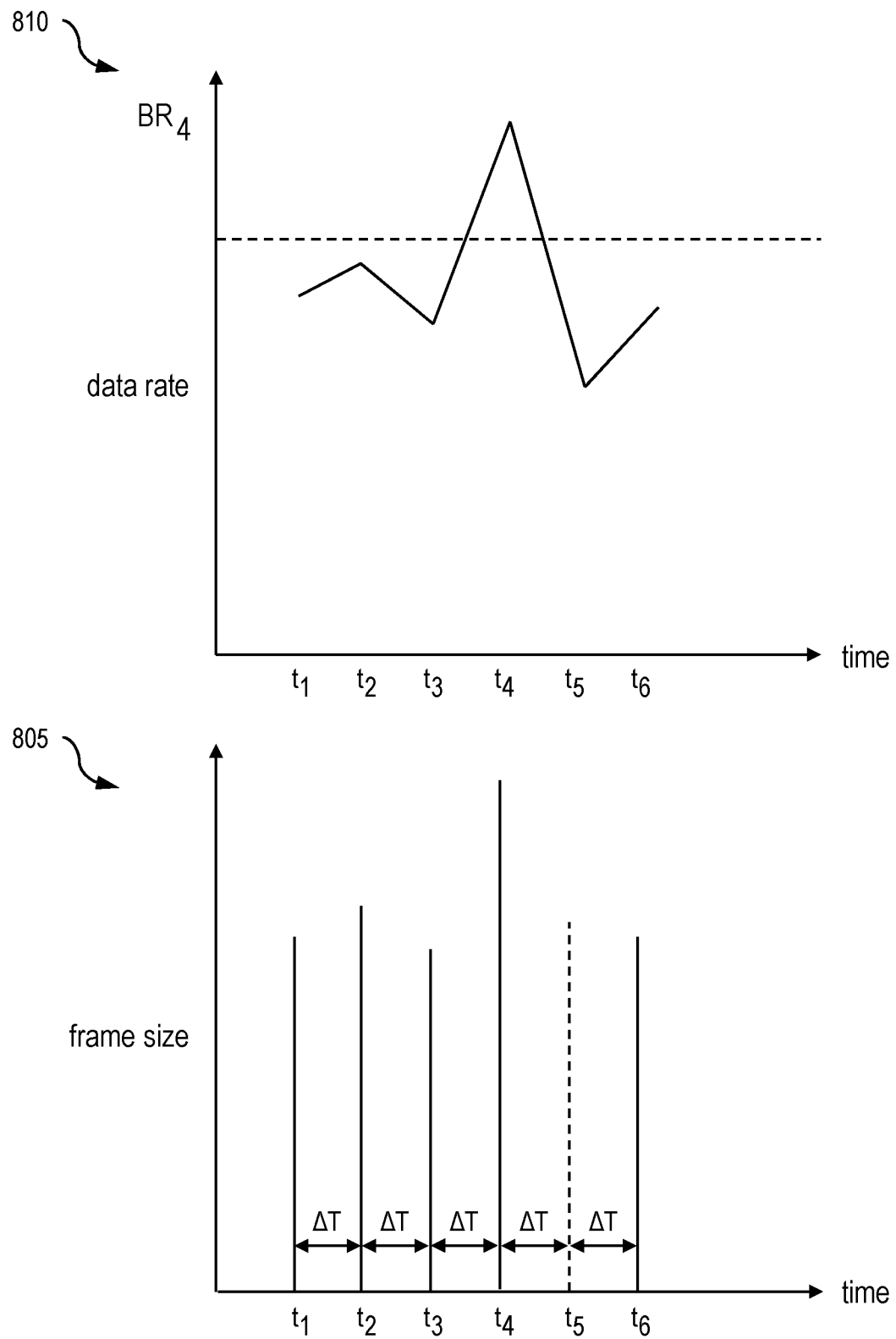

As another example, FIG. 8 illustrates a graph 805 illustrating a size of images transmitted over time according to a fixed frame rate and a graph 810 illustrating corresponding estimated data rates associated with transmitting these images in accordance with one or more embodiments of the present disclosure. The description of FIG. 7 generally applies to FIG. 8, with examples of differences and other description provided herein. In FIG. 8, rather than dropping the image at $t_4$, the image at $t_5$ is dropped. In this regard, the data rate estimation may be done using the image expected to push the data rate (e.g., to $BR_4$ in FIG. 8) over the data rate threshold (e.g., the image at $t_4$) while transmitting this image. In an aspect, the image expected to push the data rate is larger (e.g., has a lower compression ratio) and may potentially include more detail, and thus transmission of the image may be desirable. The subsequent image (e.g., the image at $t_5$) can then be dropped to allow an estimated data rate to be lowered in a next image frame time (e.g., at $t_6$).

In this regard, for FIG. 8, a frame transmission process is to send images such that a frame duration between temporally adjacent images is $\Delta T$ (or equivalently a frame transmission rate of 1/$\Delta T$). Due to the image at $t_4$ having a data rate above the data rate threshold, the frame transmission process is adjusted (e.g., by the processing circuit 325) such that the image at $t_5$ is dropped. Aside from dropping the image at $t_5$, the frame transmission process remains to send images such that the frame duration between temporally adjacent images is $\Delta T$. In an aspect, a sensor (e.g., the image sensor device 320) may capture the image at $t_5$ and a processor (e.g., the processing circuit 325) may process (e.g., encode) the image even though the image is to be dropped. Data pertaining to the processed image, such as a size of the processed image, may be used as part of data rate estimation to facilitate transmission of future frames. In such a case, the fixed frame rate mode may be referred to as a fixed image capturing frame rate mode, since the sensor is operated at a fixed frame rate even if its images are to be dropped by the processor. In another aspect, since the image at $t_5$ is to be dropped, the sensor may be set not to capture an image at $t_5$, thus conserving resources of the sensor and the processor associated with this image if it were captured.

In some cases, skipping of the capture and associated processing of an image may be referred to as dropping the image (e.g., the image at $t_5$ in FIG. 8 may be referred to as being skipped or being dropped).

Although FIGS. 7 and 8 illustrate examples in which a single frame is dropped, in some cases two or more consecutive frames may be dropped. For example, if an image size at a frame time is around double an image size at a previous, adjacent frame time, two (or more) consecutive frames may be dropped to lower an estimated data rate to a data rate lower than the data rate threshold. In an aspect, a sensor (e.g., the image sensor device 320) may capture images and a processor (e.g., the processing circuit 325) may process (e.g., encode) the images at instances in which the images are planned to be dropped. In another aspect, for images associated with time instances at which images are to be dropped, the sensor may be set not to capture images at these time instances. In some embodiments, FIGS. 7 and 8 illustrate operation of an imaging device (e.g., the camera 305) in a fixed frame rate mode.

Figure 9:
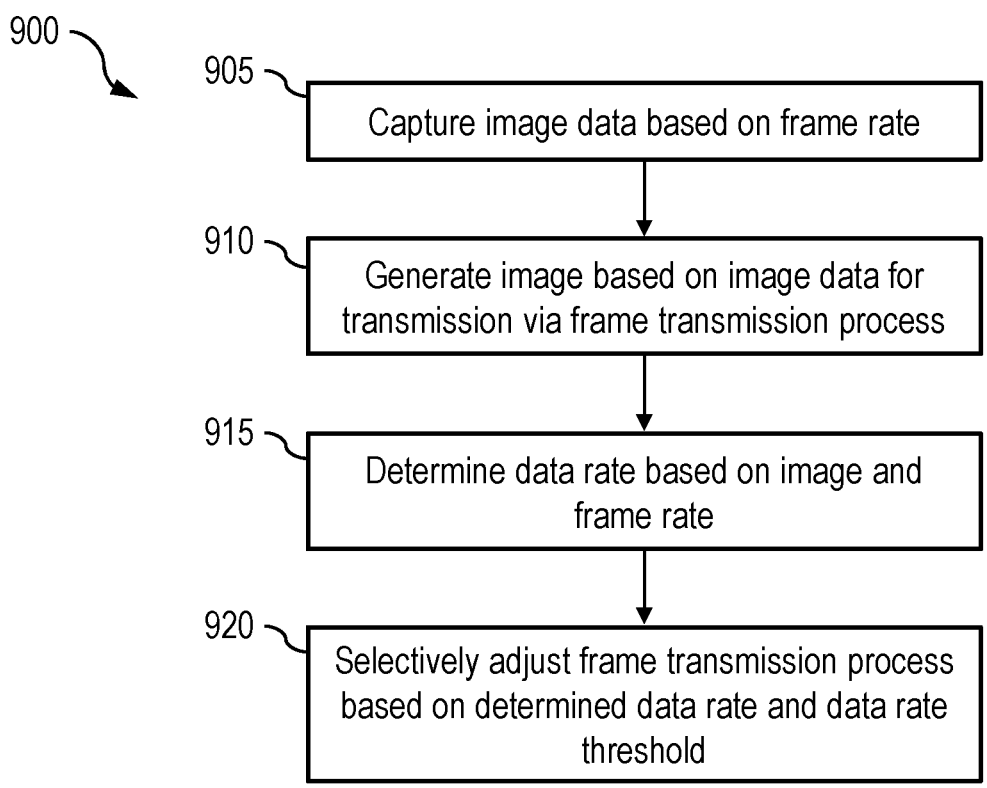
FIG. 9 illustrates a flow diagram of an example process for facilitating control of data rates associated with image transmission in accordance with one or more embodiments of the present disclosure.

FIG. 9 illustrates a flow diagram of an example process 900 for facilitating control of data rate associated with image transmission in accordance with one or more embodiments of the present disclosure. Although the process 900 is primarily described herein with reference to the camera 305 of FIG. 3 for explanatory purposes, the process 900 can be performed in relation to other imaging systems in which data rate control for image transmission is implemented. Note that one or more operations in FIG. 9 may be combined, omitted, and/or performed in a different order as desired.

At block 905, the image sensor device 320 captures image data (e.g., visible-light image data, thermal image data) in response to radiation (e.g., visible-light radiation, infrared radiation) received by the image sensor device 320. In this regard, to reach the image sensor device 320, the radiation may propagate through an optical path of the camera 305 to be received by the image sensor device 320. In some cases, the image sensor device 320 and/or circuitry coupled to the image sensor device 320 may convert the radiation into electrical signals (e.g., voltages, currents, etc.) and generate pixel values based on the electrical signals. In an aspect, the pixel values generated by the image sensor device 320 and/or associated circuitry may be represented in terms of digital count values generated based on the electrical signals obtained from converting the detected infrared radiation. For example, in a case that the image sensor device 320 includes or is otherwise coupled to an ADC circuit, the ADC circuit may generate digital count values based on the electrical signals. For an ADC circuit that can represent an electrical signal using 14 bits, the digital count value may range from 0 to 16,383.

At block 910, the processing circuit 325 generates an image based on the image data. The image is to be transmitted via a frame transmission process. For example, the frame transmission process may be to transmit generated images according to a frame transmission rate. In some cases, the processing circuit 325 may receive the image data via an image interface (e.g., the image interface 120). As one example, the image data may be received from the image sensor device 320. As another example, the image data may be received or retrieved from an image sensor device external from the camera 305 and/or a memory of the camera 305 or other system that stores captured image data.

The processing circuit 325 may process the image data to obtain the image. Processing may include transforming the image data (e.g., to the frequency domain) and/or encoding (e.g., entropy encoding) the image data. Each of the transforming and encoding may provide a compression of the image data. For example, for a given pixel of the image data, a spatial compression may be performed to encode the pixel and a neighboring pixel. The compression in this example may be based on encoding a difference (e.g., residual) between the pixel and its neighboring pixel (e.g., its previous/left neighboring pixel). In some cases, the compression may utilize fixed encoding tables or adaptive encoding tables. The adaptive encoding tables may include values that adjust based on content of (e.g., scene information from) images that precede the current image to be compressed.

At block 915, the processing circuit 325 determines a data rate (e.g., an estimated data rate) based on the image and the frame transmission rate to be used to transmit the image. In some cases, the data rate that is determined is an estimated data rate associated with (e.g., a data rate expected of) transmitting an image that is temporally adjacent and subsequent to the image. This image that is temporally adjacent and subsequent to the image may be referred to as a next image. In some cases, the data rate may be determined using an averaging algorithm. The averaging algorithm may provide a running average of data rates.

At block 920, the processing circuit 325 selectively adjusts the frame transmission process based on the determined data rate and one or more data rate thresholds. The frame transmission process may be adjusted by adjusting the frame transmission rate at which to transmit images and/or dropping the image generated at block 910 (e.g., instead of transmitting the image as set forth in the frame transmission process prior to adjustment) and/or one or more other images. An adjustment to the frame transmission process may be performed to effectuate a decrease in an expected data rate associated with transmission of images. In some cases, such as when lossy compression is used, the frame transmission process may be adjusted by adjusting complexity ratios of (e.g., adjusting data loss tolerable in) images.

In some embodiments, the processing circuit 325 may selectively adjust the frame transmission process based on a data rate control mode set for the camera 305. In some cases, the data rate control mode may be set by the user of the camera 305. In an aspect, the data rate control mode may include a variable frame rate mode or a fixed frame rate mode. As an example implementation of the variable frame rate mode, when a data rate is expected to exceed an upper data rate threshold, the frame transmission rate may be reduced. When the data rate is expected to be lower than a lower data rate threshold, the frame transmission rate may be increased. When the data rate is expected to be between the lower and upper data rate thresholds, the frame transmission rate may be maintained (e.g., left unchanged). As an example implementation of the fixed frame rate mode, when a data rate is expected to exceed an upper data rate threshold, a number of images (e.g., one or more images) may be dropped while remaining images continue to be transmitted according to a fixed frame transmission rate. The number of images that are to be dropped may be based on how much the data rate is expected to exceed the upper data rate threshold. In this regard, for the fixed frame rate mode, a time duration between temporally adjacent images that are transmitted are at a time duration $\Delta T$ or an integer multiple of the time duration.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
an image sensor device configured to capture first image data based on a first frame transmission rate; and
a processing circuit configured to:
generate, based on the first image data, a first image for transmission by the processing circuit via a frame transmission process, wherein the frame transmission process comprises transmitting images according to the first frame transmission rate;
determine a data rate based on the first image and the first frame transmission rate;
selectively adjust the frame transmission process based at least on the data rate, an upper data rate threshold, and a lower data rate threshold lower than the upper data rate threshold by adjusting the frame transmission process to obtain an adjusted frame transmission process when the determined data rate is above the upper data rate threshold, wherein the adjusted frame transmission process comprises adjusting a frame transmission rate from the first frame transmission rate to a second frame transmission rate based on the determined date rate and the upper data rate threshold; and
perform the frame transmission process to transmit the first image according to the first frame transmission rate;
wherein the image sensor device is further configured to capture second image data based on the second frame transmission rate when the determined data rate is above the upper data rate threshold, wherein the second frame transmission rate is lower than the first frame transmission rate; and
wherein the processing circuit is further configured to generate, based on the second image data, a second image for transmission via the adjusted frame transmission process when the determined data rate is above the upper data rate threshold, wherein the second image is temporally adjacent and subsequent to the first image.

2. The system of claim 1, wherein the data rate is an estimated data rate associated with the second image that is temporally adjacent and subsequent to the first image, wherein the processing circuit is further configured to receive an indication of a data rate control mode, and wherein the processing circuit is configured to selectively adjust the frame transmission process based on the data rate, the upper data rate threshold, the lower data rate threshold, and the indication.

3. The system of claim 1, wherein:
when the determined data rate is between the upper data rate threshold and the lower data rate threshold:
the processing circuit is configured to maintain the frame transmission process; and
the image sensor device is further configured to capture third image data based on the first frame transmission rate.

4. The system of claim 1, wherein:
the upper data rate threshold is a predetermined upper data rate threshold;
the lower data rate threshold is a predetermined lower data rate threshold; and
when the determined data rate is below the lower data rate threshold:
the processing circuit is configured to adjust the frame transmission process to obtain a second adjusted frame transmission process, wherein the second adjusted frame transmission process comprises increasing a frame transmission rate of the processing circuit from the first frame transmission rate to a third frame transmission rate based on the determined data rate, the upper data rate threshold, and the lower data rate threshold; and
the image sensor device is further configured to capture third image data based on the third frame transmission rate when the determined data rate is below the lower data rate threshold, wherein:
the processing circuit is further configured to generate, based on the third image data, a third image for transmission by the processing circuit via the second adjusted frame transmission process, wherein the second adjusted frame transmission process comprises transmitting the third image according to the third frame transmission rate; and
the third image is temporally adjacent and subsequent to the first image.

5. The system of claim 1, wherein the processing circuit is configured to perform compression of the first image data to obtain compressed image data, and wherein the first image comprises the compressed image data and one or more image headers, wherein, for a first pixel of the first image data, the compression associated with the first pixel is based on the first pixel and a second pixel that neighbors the first pixel, wherein the compression comprises entropy encoding of the first image data, wherein the compression of the first image data is based on at least one of lossless compression, lossy compression, spatial compression, or temporal compressing, and/or wherein the compression is based on an encoding table that is adaptive to a scene captured by the images.

6. The system of claim 1, wherein the processing circuit is configured to generate the first image by compressing and/or transforming the first image data to obtain processed image data, and wherein the first image comprises the processed image data.

7. The system of claim 1, wherein:
the image sensor device comprises a visible-light image sensor device and/or an infrared image sensor device; and
the data rate is based on a size of the first image.

8. A method comprising:
capturing first image data based on a first frame transmission rate;
generating, based on the first image data, a first image for transmission via a frame transmission process, wherein the frame transmission process comprises transmitting images according to the first frame transmission rate;
determining a data rate based on the first image and the first frame transmission rate;
selectively adjusting the frame transmission process based at least on the data rate, an upper data rate threshold, and a lower data rate threshold lower than the upper data rate threshold, wherein the selectively adjusting comprises adjusting the frame transmission process to obtain an adjusted frame transmission process when the determined data rate is below the lower data rate threshold, wherein the adjusted frame transmission process comprises increasing a frame transmission rate from the first frame transmission rate to a second frame transmission rate based on the determined data rate, the upper data rate threshold, and the lower data rate threshold;
performing the frame transmission process to transmit the first image according to the first frame transmission rate;
capturing second image data based on the second frame transmission rate when the determined data rate is below the lower data rate threshold; and
generating, based on the second image data, a second image for transmission via the adjusted frame transmission process when the determined data rate is below the lower data rate threshold, wherein the second image is temporally adjacent and subsequent to the first image.

9. The method of claim 8, wherein the data rate is an estimated data rate associated with the second image that is temporally adjacent and subsequent to the first image, wherein the method further comprises receiving user input indicative of a data rate control mode, and wherein the selectively adjusting is further based on the user input.

10. The method of claim 8, wherein the selectively adjusting further comprises adjusting the frame transmission process to obtain a second adjusted frame transmission process when the determined data rate is above the upper data rate threshold, wherein the second adjusted frame transmission process comprises adjusting a frame transmission rate from the first frame transmission rate to a third frame transmission rate based on the determined data rate and the upper data rate threshold, and wherein the method further comprises:
capturing third image data based on the third frame transmission rate when the determined data rate is above the upper data rate threshold, wherein the third frame transmission rate is lower than the first frame transmission rate; and
generating, based on the third image data, a third image for transmission via the second adjusted frame transmission process when the determined data rate is above the upper data rate threshold, wherein the third image is temporally adjacent and subsequent to the first image.

11. A method comprising:
capturing first image data based on a first frame transmission rate;
generating, based on the first image data, a first image for transmission via a frame transmission process, wherein the frame transmission process comprises transmitting images according to the first frame transmission rate;
determining a data rate based on the first image and the first frame transmission rate;
selectively adjusting the frame transmission process based at least on the data rate, an upper data rate threshold, and a lower data rate threshold lower than the upper data rate threshold, wherein the selectively adjusting comprises:
adjusting the frame transmission process to obtain an adjusted frame transmission process when the determined data rate is above the upper data rate threshold, and wherein the adjusted frame transmission process comprises dropping the first image and/or adjusting a frame transmission rate from the first frame transmission rate to a second frame transmission rate; or maintaining the frame transmission process when the determined data rate is between the upper data rate threshold and lower data rate threshold;
performing the frame transmission process to transmit the first image according to the first frame transmission rate; and
capturing second image data based on the first frame transmission rate when the determined data rate is between the upper data rate threshold and the lower data rate threshold.

12. The method of claim 11, wherein the selectively adjusting comprises adjusting the frame transmission process to obtain a second adjusted frame transmission process when the determined data rate is below the lower data rate threshold, wherein the second adjusted frame transmission process comprises increasing a frame transmission rate from the first frame transmission rate to a third frame transmission rate based on the determined data rate, the upper data rate threshold, and the lower data rate threshold, wherein the method further comprises:
capturing third image data based on the third frame transmission rate when the determined data rate is below the lower data rate threshold; and
generating, based on the third image data, a third image for transmission via the adjusted frame transmission process when the determined data rate is below the lower data rate threshold, wherein the third image is temporally adjacent and subsequent to the first image.

13. The method of claim 8, wherein the generating comprises performing compression of the first image data to obtain compressed image data, and wherein the first image comprises the compressed image data, for a first pixel of the first image data, the compression associated with the first pixel is based on the first pixel and a second pixel that neighbors the first pixel, wherein the compression comprises entropy encoding of the first image data, and/or wherein the compression of the first image data is based on at least one of lossless compression, lossy compression, spatial compression, temporal compressing, a fixed encoding table, or an encoding table adaptive to a scene.

14. The method of claim 8, wherein the generating the first image comprises compressing and/or transforming the first image data to obtain processed image data, and wherein the first image comprises the processed image data.

15. The method of claim 8, wherein:
the first image data comprises visible-light image data or the first image data comprises infrared image data;
the data rate is based on a size of the first image; and
at least two of the images transmitted according to the first frame transmission rate are compressed according to different compression ratios.

16. The method of claim 11, wherein the generating comprises performing compression of the first image data to obtain compressed image data, and wherein the first image comprises the compressed image data, for a first pixel of the first image data, the compression associated with the first pixel is based on the first pixel and a second pixel that neighbors the first pixel.

17. The method of claim 16, wherein the compression comprises entropy encoding of the first image data, and/or wherein the compression of the first image data is based on at least one of lossless compression, lossy compression, spatial compression, temporal compressing, a fixed encoding table, or an encoding table adaptive to a scene.

18. The method of claim 11, wherein the generating the first image comprises compressing and/or transforming the first image data to obtain processed image data, and wherein the first image comprises the processed image data.

19. The method of claim 11, wherein:
the first image data comprises visible-light image data or the first image data comprises infrared image data;
the data rate is based on a size of the first image; and
at least two of the images transmitted according to the first frame transmission rate are compressed according to different compression ratios.

20. The method of claim 11, wherein the selectively adjusting comprises adjusting the frame transmission process to obtain a second adjusted frame transmission process when the determined data rate is below the lower data rate threshold, and wherein the second adjusted frame transmission process comprises adjusting a frame transmission rate from the first frame transmission rate to a second frame transmission rate higher than the first frame transmission rate.

\* \* \* \* \*